US012770975B2

(12) United States Patent
Gao et al.

(10) Patent No.: US 12,770,975 B2
(45) Date of Patent: Oct. 20, 2026

(54) ZEOLITE-BASED COMPOSITE SEPARATOR FOR A LITHIUM-ION SECONDARY BATTERY AND MANUFACTURING METHOD THEREOF

(71) Applicant: Pacific Industrial Development Corporation, Ann Arbor, MI (US)

(72) Inventors: Shuang Gao, Ann Arbor, MI (US); Yunkui Li, Ann Arbor, MI (US); David Shepard, Canton, MI (US); Ashwin Sankaran, Arnhem (NL)

(73) Assignee: Pacific Industrial Development Corporation, Ann Arbor, MI (US)

( * ) Notice: Subject to any disclaimer, the term of this patent is extended or adjusted under 35 U.S.C. 154(b) by 539 days.

(21) Appl. No.: 18/268,637

(22) PCT Filed: Dec. 21, 2021

(86) PCT No.: PCT/US2021/064481
§ 371 (c)(1),
(2) Date: Jun. 21, 2023

(87) PCT Pub. No.: WO2022/146756
PCT Pub. Date: Jul. 7, 2022

(65) Prior Publication Data

US 2024/0047823 A1 Feb. 8, 2024

Related U.S. Application Data

(60) Provisional application No. 63/132,516, filed on Dec. 31, 2020.

(51) Int. Cl.
*H01M 50/446* (2021.01)
*H01M 10/0525* (2010.01)
(Continued)

(52) U.S. Cl.
CPC ..... *H01M 50/446* (2021.01); *H01M 10/0525* (2013.01); *H01M 50/403* (2021.01); *H01M 50/434* (2021.01); *H01M 50/491* (2021.01)

(58) Field of Classification Search
CPC .......... H01M 50/446; H01M 10/0525; H01M 50/403; H01M 50/434; H01M 50/491;
(Continued)

(56) References Cited

U.S. PATENT DOCUMENTS

2013/0149587 A1* 6/2013 Yu .................... H01M 50/417 429/144
2018/0254449 A1* 9/2018 Xiao .................. H01M 50/449
2018/0254531 A1 9/2018 Xiao et al.
2019/0221785 A1 7/2019 Kim et al.
2019/0229318 A1* 7/2019 Xiao .................... H01G 11/06

FOREIGN PATENT DOCUMENTS

CN 1033733380 A 4/2014
CN 108389999 A 8/2018

OTHER PUBLICATIONS

European Patent Office, Rijswijk, Netherlands, International Search Report of International Application No. PCT/US2021/064481, Mailed Apr. 11, 2022, 3 pages.

(Continued)

*Primary Examiner* — Daniel H Lee
(74) *Attorney, Agent, or Firm* — Dickinson Wright PLLC

(57) ABSTRACT

A separator for use in an electrochemical cell, such as a lithium-ion secondary battery, that includes a plurality of first inorganic particles, one or more second inorganic particles, a polymeric binder, wherein the weight ratio of the first inorganic particles to the second inorganic particles is in the range from 1:99 to 99:1 and the weight ratio of the combined first and second inorganic particles to the polymeric binder is in the range from 50:50 to 99:1. The inorganic particles being a type of Li-exchanged zeolite having a lithium (Li) concentration in the range of 0.1 wt. %
(Continued)

to 20 wt. % and a sodium (Na) concentration that is lower than 5 wt. %, based on the overall weight of the Li-exchanged zeolite. The second inorganic particles being different in composition than the first inorganic particles and having a sodium (Na) concentration in the range of 0.005 wt. % to 1.0 wt. %.

20 Claims, 6 Drawing Sheets

(51) Int. Cl.
*H01M 50/403* (2021.01)
*H01M 50/434* (2021.01)
*H01M 50/491* (2021.01)

(58) Field of Classification Search
CPC .. H01M 50/414; H01M 50/42; H01M 50/431; H01M 50/443; H01M 50/451; C01B 39/00; Y02E 60/10; Y02P 70/50
See application file for complete search history.

(56) References Cited

OTHER PUBLICATIONS

First Office Action Dated Aug. 27, 2026 from Corresponding Chinese Patent Application No. 202180092795.1, English Machine Translation Provided, 5 pages.
Search Report Dated Aug. 24, 2026 from Corresponding Chinese Patent Application No. 202180092795.1, English Machine Translation Provided, 2 pages.

* cited by examiner

ZEOLITE-BASED COMPOSITE SEPARATOR FOR A LITHIUM-ION SECONDARY BATTERY AND MANUFACTURING METHOD THEREOF

CROSS REFERENCE TO RELATED APPLICATIONS

This application is a national stage filing of International Application No. PCT/US2021/064481 filed on Dec. 21, 2021, designating the United States and published in English, which claims the benefit of the filing date under 35 U.S.C. § 119 (e) of U.S. Provisional Application No. 63/132,516 filed on Dec. 31, 2020, the entire contents of which are incorporated herein by reference in their entirety.

FIELD

This invention generally relates to a composite separator for use in an electrochemical cell, such as a lithium-ion secondary battery, and a manufacturing process to produce the same. More specifically, this disclosure relates to the use of Li-exchanged zeolites as inorganic scavenging agents or additives located along with a different or second-type of inorganic particles in a polymeric binder to form the separator of a cell used in a lithium-ion secondary battery.

BACKGROUND

The statements in this section merely provide background information related to the present disclosure and may not constitute prior art.

Lithium-ion second batteries typically provide a high energy density and are capable of undergoing a charge-discharge cycle multiple times due to the reversibility of the redox reactions that take place. Thus, lithium-ion secondary batteries are widely applied as the energy sources in many portable electronic devices (e.g., cell phones, laptop computers, etc.), power tools, electric vehicles, and grid energy storage.

The main components in a lithium-ion secondary battery generally include a negative electrode (anode), a non-aqueous electrolyte, a separator, a positive electrode (cathode), and current collectors for both electrodes. All of these components are sealed in a case, an enclosure, a pouch, a bag, a cylindrical shell, or the like (generally called the battery's "housing"). In a commercial lithium-ion battery, graphite and $Li_4Ti_5O_{12}$ represent the state-of-the-art active materials that are typically used in the negative electrode. However, silicon and lithium metal are promising materials that may replace the graphite because of their one-magnitude higher specific capacities.

The separator in a lithium-ion battery usually is a polyolefin membrane having micro-meter-size pores formed of such materials as, for example, polyethylene (PE) and polypropylene (PP). The separator prevents physical contact between the positive and negative electrodes but allows the lithium-ion to transport back and forth. Injected in the battery bag or cell is a non-aqueous electrolyte, which generally is a solution of a lithium salt, such as lithium hexafluorophosphate ($LiPF_6$), lithium bis(oxalato)borate (LiBOB), or lithium bis(trifluoro methane sulfonyl)imide (LiTFSi), in an organic carrier liquid, such as for example, ethylene carbonate (EC), ethyl methyl carbonate (EMC), diethyl carbonate (DEC), dimethyl carbonate (DMC), propylene carbonate (PC), vinylene carbonate (VC), or fluoroethylene carbonate (FEC). The active materials in positive electrodes usually are lithium transition metal oxides or phosphates, such as for example, $LiCoO_2$, $LiNi_{1-x-y}Co_xMn_yO_2$ ($x+y\leq 2/3$), $xLi_2MnO_3\cdot(1-x)LiNi_{1-y-z}Co_yMn_zO_2$ ($y+z\leq 2/3$), $LiMn_2O_4$, $LiNi_{0.5}Mn_{1.5}O_4$, or $LiFePO_4$.

The energy and power exhibited by a secondary lithium-ion battery largely depends on the active materials, namely, the materials that comprise the positive and negative electrodes. A separator plays a significant role in the battery's safety, durability, and high-rate performance. The polyolefin membrane is electrically insulating and completely separates the positive and negative electrodes in order to avoid establishing an interior short circuit. The polyolefin membrane does not conduct ions, but rather the large pores in the membrane are filled with the non-aqueous electrolyte, allowing the transport of lithium ions through the membrane.

Polyolefin membranes, however, are generally poorly wetted by the non-aqueous electrolyte, which increases the impedance for Li-ion transport and results in a poor high-rate capability. In addition, the polyolefin membrane may be subject to shrinkage at the elevated temperatures encountered during battery operation, thereby, increasing the risk of creating a short circuit and eventually leading to either a fire or an explosion. Furthermore, the softness of the polyolefin membranes further enhances the concern for safety by allowing for the growth of lithium dendrites that can easily penetrate the separator.

SUMMARY

The present disclosure relates generally to a composite separator for use in an electrochemical cell, such as a lithium-ion secondary battery, and a manufacturing process to produce the same. More specifically, this disclosure relates to the use of Li-exchanged zeolites as inorganic scavenging agents or additives located along with a different or second-type of inorganic particles in a polymeric binder to form the separator of a cell used in a lithium-ion secondary battery.

According to one aspect of the present disclosure, a composite separator for use in an electrochemical cell is provided that comprises a plurality of first inorganic particles, one or more second inorganic particles, and a polymeric binder with the weight ratio of the first inorganic particles to the second inorganic particles being in the range from 1:99 to 99:1 and the weight ratio of the combined first and second inorganic particles to the polymeric binder being in the range from 50:50 to 99:1. The first inorganic particles are a type of Li-exchanged zeolite having a lithium (Li) concentration in the range of 0.1 wt. % to 20 wt. % and a sodium (Na) concentration that is lower than 5 wt. %, based on the overall weight of the Li-exchanged zeolite. The second inorganic particles are different in composition than the first inorganic particles. The second inorganic particles have a sodium (Na) concentration in the range of 0.005 wt. % to 1.0 wt. %.

The thickness of the composite separator may range from 5 μm to 50 μm. The porosity of the composite separator may be between 20% and 60%.

The Li-exchanged zeolite may have a framework selected from ABW, AFG, BEA, BHP, CAS, CHA, CHI, DAC, DOH, EDI, ESV, FAU, FER, FRA, GIS, GOO, GON, HEU, KFI, LAU, LTA, LTN, MEl, MER, MOR, MSO, NAT, NES, PAR, PAU, PHI, RHO, RTE, SOD, STI, TER, THO, VET, YUG, and ZSM. The Li-exchanged zeolite may have a $SiO_2/Al_2O_3$ ratio that is between 1 and 100, an average particle size (D50) that is in the range from 0.01 μm to 2 μm, a surface area in the range of 10-1000 $m^2/g$, and/or a pore volume in the range of 0.1-2.0 cc/g.

The second inorganic particles may be selected from the group consisting of silica, α-alumina, β-alumina, γ-alumina, θ-alumina, κ-alumina, χ-alumina, magnesium oxide, titanium oxide, zirconium oxide, alumina silicate, calcium silicate, magnesium silicate, calcium carbonate, boehmite, pseudo-boehmite, kaolin, aluminum hydroxide, magnesium hydroxide, and perovskites. Alternatively, the one or more second inorganic particles are selected as α-alumina, β-alumina, γ-alumina, θ-alumina, boehmite, pseudo-boehmite, and aluminum hydroxide. The second inorganic particles may have an average particle size ($D_{50}$) that is in the range of 0.01 micrometers (μm) to about 2 μm.

The polymeric binder may be a polyacrylic acid (PAA), a polyamide-imide (PAI), a polyacrylonitrile (PAN), a polyaniline (PANI), a polyether ether ketone (PEEK), a polyethylene glycol (PEG), a polyethylene oxide (PEO), a polyethylene terephthalate (PETG), a polymethyl methacrylate (PMMA), a polyphthalamide (PPA), a polystyrene (PS), a polyurethane (PU), a polyvinyl alcohol (PVA), a polyvinyl chloride (PVC), a polyvinylidene fluoride (PVDF), a polyvinylpyrrolidone (PVP), or a combination thereof.

According to yet another aspect of the present disclosure, a method of forming a composite separator for use in an electrochemical cell is provided. This method generally comprises drying a plurality of first inorganic particles, drying one or more second inorganic particles, combining the dried first and second inorganic particles with a polymeric binder in an organic solvent to form a slurry depositing the slurry onto a surface of either a positive electrode film or a negative electrode film to form a layer thereon; and drying the deposited slurry layer to form the composite separator, such that the composite separator is adhered to the surface of either the positive electrode film or the negative electrode film. The first inorganic particles are a type of Li-exchanged zeolite that has a lithium (Li) concentration in the range of 0.1 wt. % to 20 wt. % and a sodium (Na) concentration that is lower than 5 wt. %, based on the overall weight of the Li-exchanged zeolite. The second inorganic particles are different in composition than the first inorganic particles with the second inorganic particles having a sodium (Na) concentration in the range of 0.005 wt. % to 1.0 wt. %. The weight ratio of the first inorganic particles to the second inorganic particles is in the range from 1:99 to 99:1, while the weight ratio of the combined first and second inorganic particles to the polymeric binder is in the range from 50:50 to 99:1. The solid loading in the slurry is between 1% to 50%.

Further areas of applicability will become apparent from the description provided herein. It should be understood that the description and specific examples are intended for purposes of illustration only and are not intended to limit the scope of the present disclosure.

DESCRIPTION OF THE DRAWINGS

In order that the disclosure may be well understood, there will now be described various forms thereof, given by way of example, reference being made to the accompanying drawings. The components in each of the drawings may not necessarily be drawn to scale, but rather emphasis is placed upon illustrating the principles of the invention.

Figure 1:
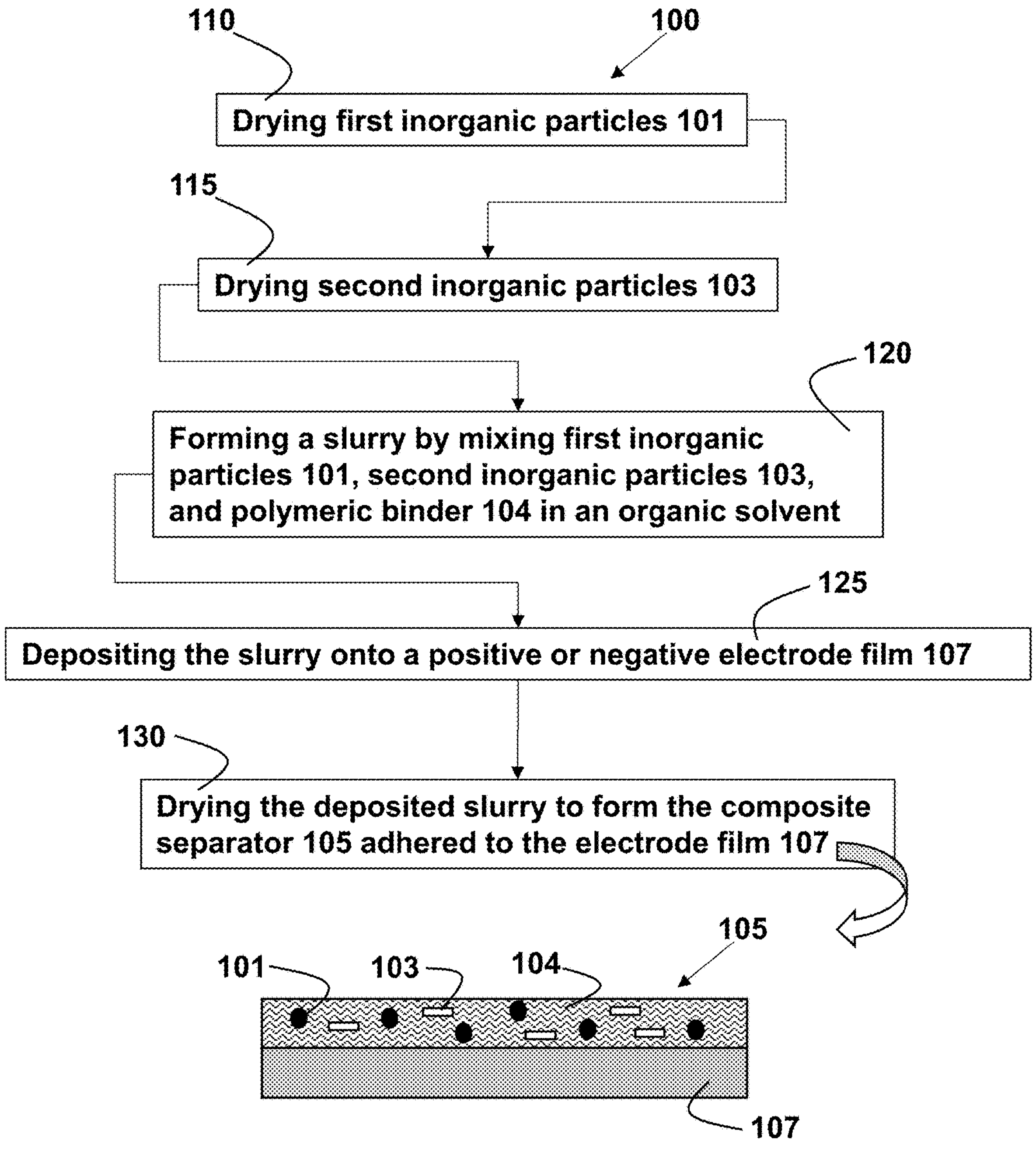
FIG. 1 is a flowchart demonstrating a method of forming a composite separator for use in an electrochemical cell according to the teachings of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the zeolites made and used according to the teachings contained herein is described throughout the present disclosure in conjunction with a secondary cell for use in a lithium-ion secondary battery in order to more fully illustrate the structural elements and the use thereof. The incorporation and use of such inorganic materials as additives in other applications, including without limitation in other electrochemical cells, such as for example a primary cell used in a lithium-ion battery, is contemplated to be within the scope of the present disclosure. It should be understood that throughout the description and drawings, corresponding reference numerals indicate like or corresponding parts and features.

The main difference between a lithium-ion battery and a lithium-ion secondary battery is that the lithium-ion battery represents a battery that includes a primary cell and a lithium-ion secondary battery represents a battery that includes secondary cell. The term "primary cell" refers to a battery cell that is not easily or safely rechargeable, while the term "secondary cell" refers to a battery cell that may be recharged. As used herein a "cell" refers to the basic electrochemical unit of a battery that contains the electrodes, separator, and electrolyte. In comparison, a "battery" refers to a collection of cell(s), e.g., one or more cells, and includes a housing, electrical connections, and possibly electronics for control and protection.

Since lithium-ion (e.g., primary cell) batteries are not rechargeable, their current shelf life is about three years, after that, they are worthless. Even with such a limited lifetime, lithium batteries can offer more in the way of capacity than lithium-ion secondary batteries. Lithium batteries use lithium metal as the anode of the battery unlike lithium ion batteries that can use a number of other materials to form the anode.

One key advantage of lithium-ion secondary cell batteries is that they are rechargeable several times before becoming ineffective. The ability of a lithium-ion secondary battery to undergo the charge-discharge cycle multiple times arises from the reversibility of the redox reactions that take place as previously discussed above.

The lithium-ion secondary battery generally comprises a housing with one or more cells located therein. Each cell includes a negative electrode, a non-aqueous electrolyte, a separator, a positive electrode, and a current collector for each of the electrodes. During operation, it is desirable that the Coulombic or current efficiency and the discharge capacity exhibited by the battery remains relatively constant. The Coulombic efficiency describes the charge efficiency by which electrons are transferred within the battery. The discharge capacity represents the amount of charge that may be extracted from a battery.

A variety of factors can cause degradation in lithium-ion secondary batteries. One of these factors is the existence of various malicious species in the non-aqueous electrolyte. These malicious species include moisture (e.g., water or water vapor), hydrogen fluoride (HF), and dissolved transition-metal ions ($TM^{n+}$). In fact, the lifetime of a lithium-ion secondary battery can become severely limited once 20% or more of the original reversible capacity is lost or becomes irreversible. The ability to prolong the rechargeable capacity and overall lifetime of lithium-ion secondary batteries can decrease the cost of replacement and reduce the environmental risks for disposal and recycling.

Moisture in the electrolyte mainly arises as a fabrication residue and from the decomposition of the organic electrolyte. Although a dry environment is desired, the presence of moisture cannot be thoroughly excluded during the conventional production of a battery or battery cell. The organic solvent in the electrolyte is also inclined to decompose to yield $CO_2$ and $H_2O$, especially when operated at a high temperature. The water ($H_2O$) can react with a lithium salt, such as $LiPF_6$, resulting in the generation of lithium fluoride (LiF) and hydrogen fluoride (HF). The lithium fluoride (LiF), which is insoluble, can deposit on the surfaces of the active materials of the anode or cathode forming a solid electrolyte interface (SEI). This solid electrolyte interface (SEI) may reduce or retard the lithium-ions (de)intercalation and inactivate the surface of the active material, thereby, leading to a poor rate capability and/or capacity loss.

Hydrogen fluoride (HF), when present, may attack the positive electrode, which contains transition metal and oxygen ions, resulting in the formation of more water and transition metal compounds that are compositionally different from the active material. When water is present and acts as a reactant, the reactions that occur may become cyclic, resulting in continual damage to the electrolyte and the active material. In addition, the transition metal compounds that are formed may be insoluble and electrochemically inactive. These transition metal compounds may reside on the surface of the positive electrode, thereby, forming an SEI. On the other hand, any soluble transition metal compounds may dissolve into the electrolyte resulting in transition metal ions ($TM^{n+}$). These free transition metal ions, such as, for example, $Mn^{2+}$ and $Ni^{2+}$, can move towards the anode where they may be deposited as an SEI leading to the introduction of a variety of different reactions. These reactions, which may consume the active materials of the electrodes and the lithium-ions present in the electrolyte, can also lead to capacity loss in the lithium-ion secondary battery.

The present disclosure generally provides an inorganic material that comprises, consists essentially of, or consists of one or more types of a lithium-ion exchanged zeolites that can absorb malicious species, such as moisture ($H_2O$), free transition-metal ions ($TM^{n+}$) and/or hydrogen fluoride (HF) that may become present or formed within the housing of a lithium-ion secondary battery, such as in the aqueous electrolyte solution. The removal of these malicious species prolongs the battery's calendar and cycle lifetime when the inorganic material is applied to or incorporated in the separator.

In order to deal with the problems as discussed above, the inorganic material acts as a trapping agent or scavenger for the malicious species present within the aqueous electrolyte solution of the battery. The inorganic material accomplishes this objective by effectively absorbing moisture, free transition-metal ions, and/or hydrogen fluoride (HF) selectively, while having no effect on the performance of the non-aqueous electrolyte, including the lithium-ions and organic transport medium contained therein. The multifunctional inorganic particles may be introduced into the lithium-ion secondary battery or each cell therein as an additive contained within the separator or in a coating material applied to the separator.

As previously mentioned, moisture in the housing (e.g., battery bag) mainly comes from the fabrication residue and decomposition of the organic electrolyte. Although the need for a dry environment is known, moisture cannot be removed thoroughly during the production of batteries. In addition, the organic electrolyte solvent is inclined to decompose to yield $CO_2$ and $H_2O$, especially when the operating temperature in the battery is high. Water ($H_2O$) can react with a lithium (Li) salt, such as $LiPF_6$, to generate LiF and HF. The reactions that occur from moisture residue being present in a Li-ion battery are shown in Equations 1) and 2), wherein M stands for a transition metal that is typically present in the material of the positive electrode.

$$LiPF_6 + H_2O \rightarrow HF + LiF\downarrow + H_3PO_4 \qquad \text{Eq. 1)}$$

$$\nwarrow$$

$$LiMO_2 + HF \rightarrow LiF\downarrow + M^{2+} + H_2O \qquad \text{Eq. 2)}$$

LiF, which is insoluble, can deposit on the surfaces of active materials (e.g., positive or negative electrodes) forming a solid electrolyte interface (SEI). The formation of a SEI can retard the Li-ions (de)intercalation and inactivate the surface of active materials leading to a poor rate capability and capacity loss. Furthermore, HF can attack the positive electrode which contains both transition metal and oxygen ions, forming more $H_2O$ and transition-metal-containing compounds other than the active material, as shown in Equation 2). The residual water ($H_2O$) as the reactant in Eq. 1) and as the product in Eq. 2) links both of these reactions cyclically, thereby, accelerating the damage to both the electrolyte and active material.

In addition, a portion of the transition-metal-containing compounds formed during operation of the battery is insoluble and electrochemically inactive. These compounds may reside on the surface of the positive electrode forming a SEI. On the other hand, the soluble part can dissolve into the organic electrolyte in ionic form. The free transition-metal ions ($TM^{n+}$), such as $Mn^{2+}$, $Ni^{2+}$, and $Co^{2+}$, can shuttle to the negative electrode and become deposited as a SEI with a variety of succeeding reactions. The reactions mentioned above consume the active materials and that Li ions in the electrolyte continuously, thereby, being responsible for the capacity loss of the lithium-ion battery.

The incorporation of Li-exchanged zeolites may increase the cell's cycle life when being coated onto a separator used in the lithium-ion battery, because they not only strengthen the polymer membrane and improve wetting, but also prevent degradation by scavenging moisture, hydrofluoric acid, and free transition-metal ions in the non-aqueous electrolyte. However, conventional coating methods are usually performed with an aqueous slurry, which results in the zeolite particles being saturated with free moisture in the porous structure. After being coated using such a conventional method, the separator membrane cannot be treated higher than about 80° C. due to the low melting point of the polymeric (e.g., polyolefin) portion of the membrane. Under such a condition, free moisture is very difficult to fully remove from the separator. The presence of residual moisture results in initiation of the reactions described above in Eq. 1) and Eq. 2) and will limit the effectiveness of incorporating a lithium-exchanged zeolite into the separator.

In order to utilize the scavenging function of Li-exchanged zeolite and avoid the initial presence of moisture in the separator, the present disclosure describes both a new type of separator and a method of effectively manufacturing the separator. The separator of the present disclosure generally comprises, consists of, or consists essentially of three components, namely a Li-exchanged zeolite ($1^{st}$ component), a second inorganic particle type ($2^{nd}$ component), and a polymeric binder ($3^{rd}$. component).

The first component of the separator is a plurality of Li-exchanged zeolites that act as a scavenging agent. The morphology of these zeolites is either platelet, cubic, spherical, or a combination thereof. Alternatively, the morphology is predominately, spherical in nature. These particles may exhibit an average particle size or diameter ($D_{50}$) of 0.01 micrometers (μm) to 2 micrometers (μm). Alternatively, the average particle size ($D_{50}$) is in the range of about 0.01 micrometers (μm) to about 1.5 micrometers (μm); alternatively about 0.05 micrometers (μm) to about 1.0 micrometers (μm); alternatively, 0.25 micrometers (μm) to about 1.75 micrometers (μm); alternatively, 0.1 micrometer (μm) to about 2 micrometers (μm); alternatively, greater than or equal to 0.05 μm; alternatively, greater than or equal to 0.1 μm; alternatively, less than 2.0 μm. Scanning electron microscopy (SEM) or other optical or digital imaging methodology known in the art may be used to determine the shape and/or morphology of the inorganic additive or particles. The average particle size and particle size distributions may be measured using any conventional technique, such as sieving, microscopy, Coulter counting, dynamic light scattering, or particle imaging analysis, to name a few. Alternatively, a laser particle analyzer is used for the determination of average particle size and its corresponding particle size distribution.

The surface area and pore volume for the Li-exchanged zeolites range 10 to 1000 $m^2/g$ and from 0.1 to 2.0 cc/g, respectively. Alternatively, the Li-exchanged zeolites exhibit a surface area that is in the range of about 20 $m^2/g$ to about 900 $m^2/g$; alternatively from about 25 $m^2/g$ to about 800 $m^2/g$; alternatively, from about 40 $m^2/g$ to about 750 $m^2/g$; alternatively, about 50 $m^2/g$ to about 500 $m^2/g$. The pore volume of the Li-exchanged zeolites may alternatively be in the range of about 0.15 cc/g to about 1.75 cc/g; alternatively, 0.2 cc/g to about 1.5 cc/g. The measurement of surface area and pore volume for the inorganic additive or particles may be accomplished using any known technique, including without limitation, microscopy, small angle x-ray scattering, mercury porosimetry, and Brunauer, Emmett, and Teller (BET) analysis. Alternatively, the surface area and pore volume are determined using Brunauer, Emmett, and Teller (BET) analysis.

The $SiO_2/Al_2O_3$ ratio (SAR) ranges from 1 to 100; alternatively, between 2 and 75; alternatively, ranging from about 2 and 50; alternatively, between about 2 and 25; alternatively, ranging from about 2 to about 20; alternatively, ranging from about 5 to about 15. The framework of zeolite may be chosen from, but not limited to, ABW, AFG, BEA, BHP, CAS, CHA, CHI, DAC, DOH, EDI, ESV, FAU, FER, FRA, GIS, GOO, GON, HEU, KFI, LAU, LTA, LTN, MEl, MER, MOR, MSO, NAT, NES, PAR, PAU, PHI, RHO, RTE, SOD, STI, TER, THO, VET, YUG, and ZSM. Alternatively, the framework of the zeolite is chosen from a CHA, CHI, FAU, LTA, or LAU framework.

The concentration of sodium (Na) ions present in the Li-exchanged zeolites is initially in the range of 0.1 to 25 wt. %. Alternatively, the Na concentration may range from about 0.1 to 20 wt. %; alternatively, about 0.2 wt. % to about 15.0 wt. %; alternatively, between 0.3 wt. % and 12.5 wt. %; alternatively, greater than 0.15 wt. % and less than 17.5 wt. %. Lithium ions may replace some of the initial sodium ions in the framework by ion-exchanging to reach a concentration that is between 0.1 wt. % and 20 wt. %. Alternatively, the concentration of lithium ion is about 0.1 wt. % to about 10 wt. %; alternatively, about 0.15 wt. % to about 9 wt. %; alternatively, about 0.2 wt. % to about 8 wt. %; alternatively, about 0.5 wt. % to about 7.5 wt. %; alternatively, about 0.5 wt. % to about 5.0 wt. %, based on the overall weight of the Li-exchanged zeolites. The amount of sodium (Na) ions remaining in the Li-exchanged zeolites may be less than 15 wt. %; alternatively, less than 10 wt. %; alternatively, less than 5.0 wt. %; alternatively, less than 3.0 wt. %; alternatively, between 0.01 wt. % and 5.0 wt. %. When desirable, the Li-exchanged zeolites may further include one or more doping elements selecting from Al, Mn, Sm, Y, Cr, Eu, Er, Ga, Zr, and Ti. The amount of the Li-exchanged zeolites present in the separator may be greater than 0 wt. % and up to 99 wt. %; alternatively, up to 75 wt. %; alternatively, between 0.1 wt. % and 50 wt. %, relative to the overall weight of the separator.

The second component of the separator is the inclusion of a plurality of another type of inorganic particles that strengthen the composite separator and assist in maintaining its physical integrity. The second-type of inorganic particles may be selected from the group consisting of silica, α-alumina, β-alumina, γ-alumina, θ-alumina, κ-alumina, χ-alumina, magnesium oxide, titanium oxide, zirconium oxide, alumina silicate, calcium silicate, magnesium silicate, calcium carbonate, boehmite, pseudo-boehmite, kaolin, aluminum hydroxide, magnesium hydroxide, and perovskites. Alternatively, the one or more second inorganic particles are selected as α-alumina, β-alumina, γ-alumina, θ-alumina, boehmite, pseudo-boehmite, or aluminum hydroxide. The second inorganic particles exhibit a morphology that is either platelet, cubic, sphere, or irregular and has an average particle size ($D_{50}$) that is in the range of 0.01 micrometers (μm) to about 2 μm; alternatively, between about 0.1 μm and about 1.75 μm; alternatively, between about 0.2 μm and 1.5 μm. The concentration of sodium (Na) ions in the one or more second inorganic particles is in the range of 0.005 wt. % to 1.0 wt. %; alternatively, between about 0.01 wt. % and 0.75 wt. %; alternatively, between about 0.007 wt. % and 0.75 wt. %; alternatively, between about 0.05 wt. % and 0.5 wt. %; alternatively, between about 0.01 wt. % and 0.3 wt.

%; alternatively, about 0.05 wt. % and 0.25 wt. % based on the overall weight of the second inorganic particles.

The third component in the separator is a polymeric binder configured to hold or secure the first and second components in a location or provide support for the first and second components, as well as provide flexibility to the separator. This third component may be one or more selected from polyacrylic acid (PAA), polyamide-imide (PAI), polyacrylonitrile (PAN), polyaniline (PANI), polyether ether ketone (PEEK), polyethylene glycol (PEG), polyethylene oxide (PEO), polyethylene terephthalate (PETG), polymethyl methacrylate (PMMA), polyphthalamide (PPA), polystyrene (PS), polyurethane (PU), polyvinyl alcohol (PVA), polyvinyl chloride (PVC), polyvinylidene fluoride (PVDF), or polyvinylpyrrolidone (PVP). Alternatively, this third component is a polymeric binder comprising, without limitation, polyolefin based materials with semi-crystalline structure, such as polyethylene, polypropylene, and blends thereof, as well as micro-porous poly(methyl methacrylate)-grafted, siloxane grafted polyethylene or polyvinylidene fluoride (PVDF).

A method of forming a composite separator as previously described above and further defined herein is provided in FIG. 1. According to this method 100, prior to fabricating the separator 105, the Li-exchanged zeolites 101 and the second inorganic particles 103 may be dried or calcined 110, 115 to partially or completely remove the presence of any free moisture therein. A slurry is formed 120 by blending the dried Li-exchanged zeolites 101, the second inorganic particles 103, and polymeric binder 104 in an organic solvent. The organic solvent may be selected as one or more of 1-butanol, acetone, diethylene glycol, diethyl ether, dimethylformamide (DMF), ethanol, ethyl acetate, ethylene glycol, isopropanol, methanol, pentane, toluene, or the like. Solid loading of the slurry is between 1 wt. % and 50 wt. % relative to the overall weight of the slurry. The mass ratio of the Li-exchanged zeolites 101 to the second inorganic particles 103 ranges from 99:1 to 1:99, while the mass ratio of the combined total of first and second inorganic particles 101, 103 to the polymeric binder 104 ranges from 50:50 to 99:1. The polymeric binder and organic solvent combination is chosen such that the polymeric binder is soluble in the organic solvent at least to the degree that allows the combination to be coated or extruded. The slurry is then deposited 125 onto an electrode film 107, either on the negative or positive electrode by using a known coating process such as screen printing, film casting, gravure coating, knife-coating, spray coating, dip coating, or the like. The applied coating may be dried 130 using any conventional method, such as without limitation, by the application of heat or under vacuum in order to evaporate and remove the organic solvent. The Li-exchanged zeolite 101, second inorganic particles 103, and the polymeric binder 104 form a porous layer or film attached to the electrode film 107 that is configured to perform as a separator 105.

The composite separator 105 layer described above remains adhered to the electrode film 107 without detachment or delamination during the fabrication of the cell and/or battery. The thickness of the separator layer should be in the range of 5 to 50 μm; alternatively between about 10 to 3 μm. In order to effectively operate as the separator in a Li-ion battery, the Li-zeolite-based composite layer should have a pore size that is smaller than 1 μm, a porosity around 40%, good wettability to the non-aqueous electrolyte, and appropriate mechanical properties for enduring exposure to both manufacturing and electrochemical operations. These properties are influenced by formulation and/or the chosen coating process.

The scavenging function of the Li-exchanged zeolite allows the composite separator to have an extended cycle life compared to a conventional polyolefin-based or non-woven separator. In addition, the aforementioned fabrication process results in a substantial improvement in the specific and volumetric capacity of the Li-ion batteries.

Referring to FIGS. 2A-2D, an electrochemical cell 2A, 2C or a secondary lithium-ion cell 2B, 2D generally comprises a positive electrode 10, a negative electrode 20, a non-aqueous electrolyte 30, and a separator 40. The positive electrode 10 comprises an active material that acts as a cathode 5 for the cell 1 and a current collector 7 that is in contact with the cathode 5, such that ions 45 (e.g., Li+) flow from the cathode 5 to the anode 15 when the cell 1 is charging. Similarly, the negative electrode 20 comprises an active material that acts as an anode 15 for the cell 1 and a current collector 17 that is in contact with the anode 15, such that ions 45 (e.g., Li+) flow from the anode 15 to the cathode 5 when the cell 1 is discharging. The contact between the cathode 5 and the current collector 7, as well as the contact between the anode 15 and the current collector 17, may be independently selected to be direct or indirect contact; alternatively, the contact between the anode 15 or cathode 5 and the corresponding current collector 17, 7 is directly made.

The non-aqueous electrolyte 30 is positioned between and in contact with, i.e., in fluid communication with, both the negative electrode 20 and the positive electrode 10. This non-aqueous electrolyte 30 supports the reversible flow of ions 45 between the positive electrode 10 and the negative electrode 20. The separator 40 is placed between the positive electrode 10 and negative electrode 20, such that the separator 40 separates the anode 15 and a portion of the electrolyte 30 from the cathode 5 and the remaining portion of the electrolyte 30. The separator 40 is permeable to the reversible flow of ions 45 there through.

The separator 40 includes the lithium exchanged zeolite 50*a*, the second inorganic particles 50*b*, and the polymeric binder 50*c* such that the separator absorbs one or more of moisture, free transition metal ions, or hydrogen fluoride (HF), as well as other malicious species that become present in the cell. Alternatively, the separator with the Li-exchanged zeolite, $2^{nd}$ inorganic particle, and polymeric binder 50(*a*-*c*) selectively absorbs moisture, free transition metal ions, and/or hydrogen fluoride (HF).

Figure 2A:
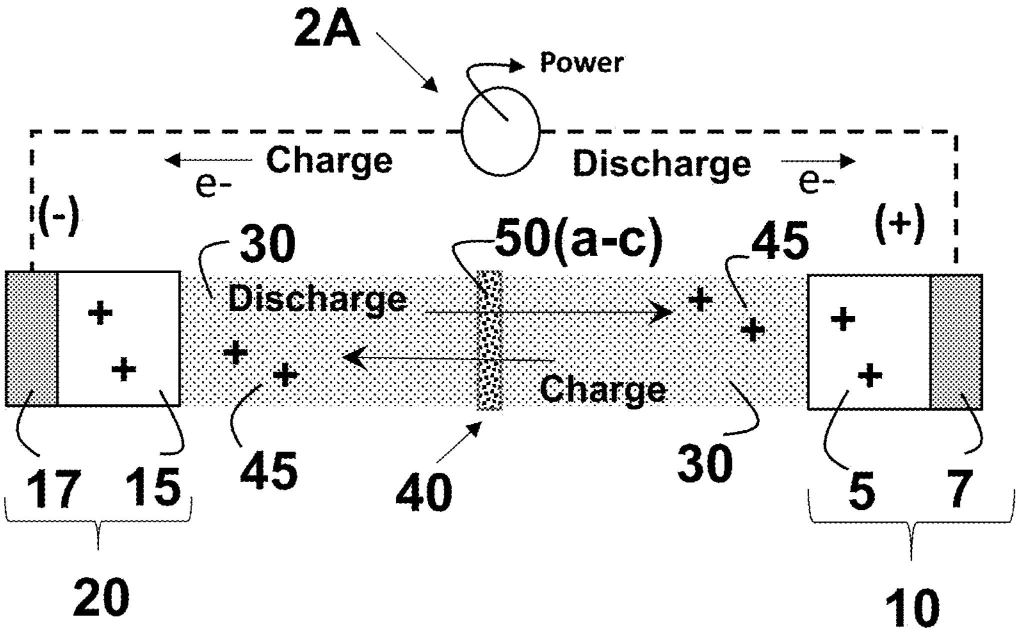
FIG. 2A is a schematic representation of an electrochemical cell formed according to the teachings of the present disclosure.
Figure 2B:
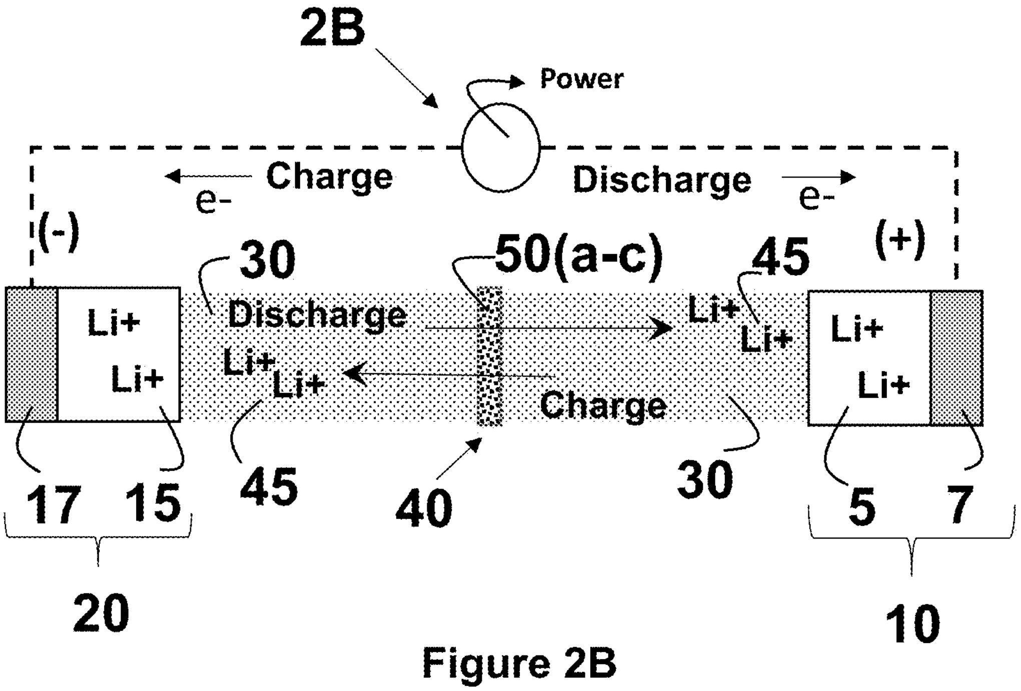
FIG. 2B is a schematic representation of the electrochemical cell of FIG. 2A shown as a lithium-ion secondary cell formed according to the teachings of the present disclosure.
Figure 2C:
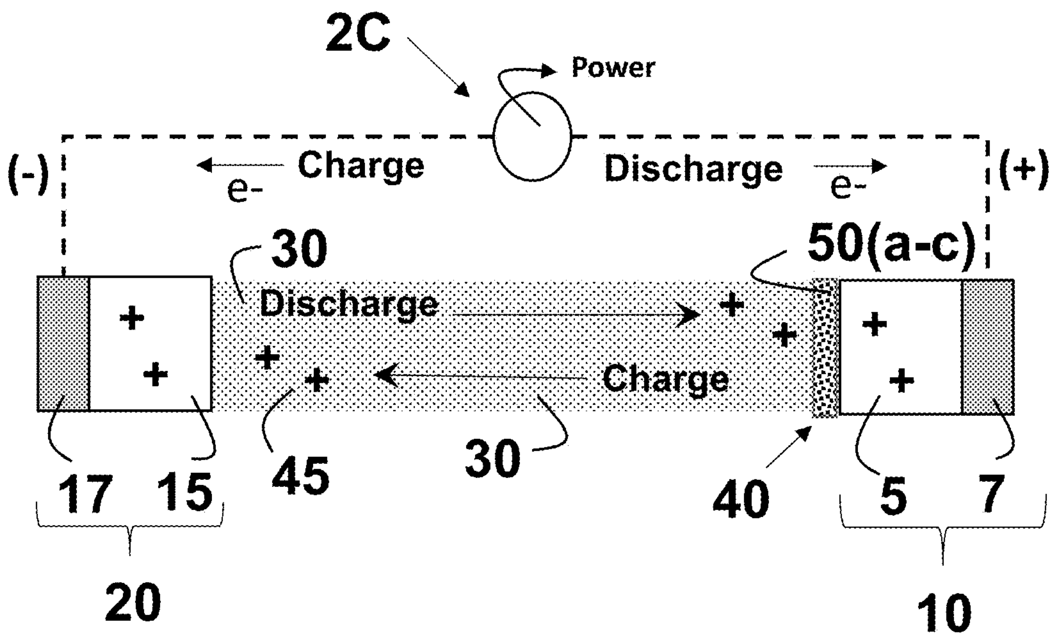
FIG. 2C is a schematic representation of another electrochemical cell formed according to the teachings of the present disclosure.
Figure 2D:
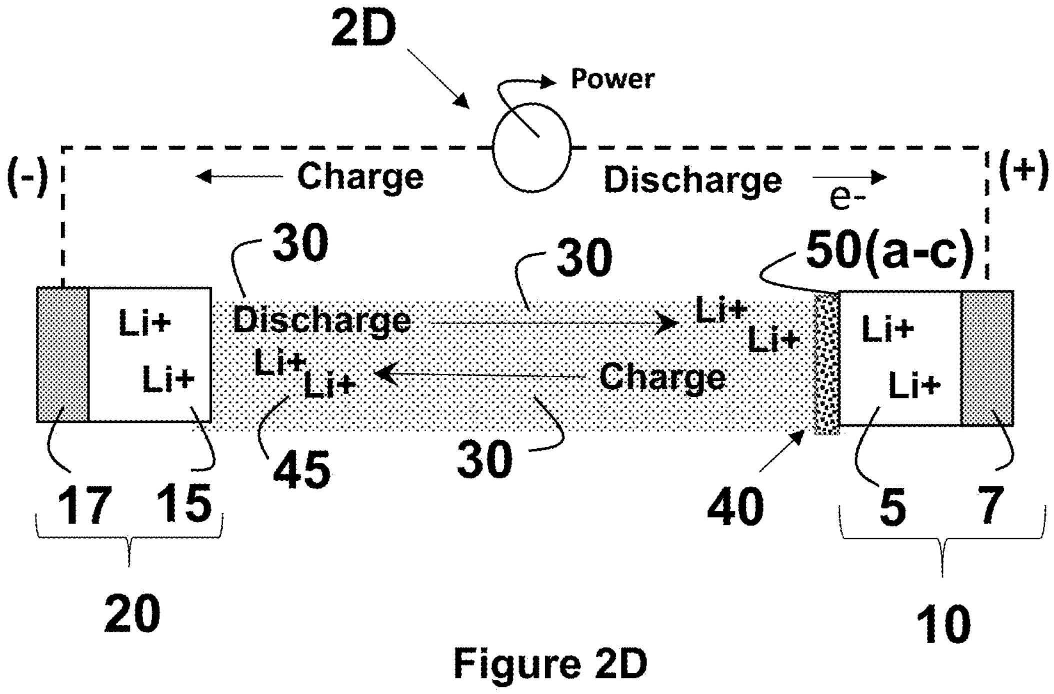
FIG. 2D is a schematic representation of the electrochemical cell of FIG. 2C shown as a lithium-ion secondary cell formed according to the teachings of the present disclosure.

Still referring to FIGS. 2A-2D, the Li-exchanged zeolite 50*a* and the second inorganic particles 50*b* may be dispersed within at least a portion of the polymeric binder 50*c* in order to form a separator 40 used in an electrochemical cell 2A, such as a lithium ion battery 2B (see FIGS. 2A-2B) According to another aspect of the present disclosure, the Li-exchanged zeolites 50*a*, second inorganic particles 50*b* dispersed within the polymeric binder 50C may be applied as a coating or film onto a portion of the surface of positive electrode 10 or negative electrode 20 used in an electrochemical cell 2C, such as a lithium ion battery 2D (see FIGS. 2C-2D).

Zeolites are crystalline or quasi-crystalline aluminosilicates comprised of repeating $TO_4$ tetrahedral units with T being most commonly silicon (Si) or aluminum (Al). These repeating units are linked together to form a crystalline framework or structure that includes cavities and/or channels of molecular dimensions within the crystalline structure. Thus, aluminosilicate zeolites comprise at least oxygen (O), aluminum (Al), and silicon (Si) as atoms incorporated in the framework structure thereof. Since zeolites exhibit a crystalline framework of silica ($SiO_2$) and alumina ($Al_2O_3$) interconnected via the sharing of oxygen atoms, they may be characterized by the ratio of $SiO_2$:$Al_2O_3$(SAR) present in the crystalline framework.

The Li-exchanged zeolites of the disclosure exhibits a framework topology as previously described above. These frameworks are usually characterized by a three letter notation that represent the name associated with the type of framework. For example, of a chabazite framework is characterized by a framework notation of "CHA", a chiavennite framework by "CHI", a faujasite by "FAU", a linde type A framework by "LTA", and an laumontite framework by "LAU". The framework notation represents a code specified by the International Zeolite Associate (IZA) that defines the framework structure of the zeolite. Thus, for example, a chabazite means a zeolite in which the primary crystalline phase of the zeolite is "CHA".

The crystalline phase or framework structure of a zeolite may be characterized by X-ray diffraction (XRD) data. However, the XRD measurement may be influenced by a variety of factors, such as the growth direction of the zeolite; the ratio of constituent elements; the presence of an adsorbed substance, defect, or the like; and deviation in the intensity ratio or positioning of each peak in the XRD spectrum. Therefore, a deviation of 10% or less; alternatively, 5% or less; alternatively, 1% or less in the numerical value measured for each parameter of the framework structure for each zeolite as described in the definition provided by the IZA is within expected tolerance.

According to one aspect of the present disclosure, the zeolites of the present disclosure may include natural zeolites, synthetic zeolites, or a mixture thereof. Alternatively, the zeolites are synthetic zeolites because such zeolites exhibit greater uniformity with respect to SAR, crystallite size, and crystallite morphology, as well has fewer and less concentrated impurities (e.g. alkaline earth metals).

Still referring to FIGS. 2A-2D, the active materials in the positive electrode 10 and the negative electrode 20 may be any material known to perform this function in a lithium-ion secondary battery. The active material used in the positive electrode 10 may include, but not be limited to lithium transition metal oxides or transition metal phosphates. Several examples of active materials that may be used in the positive electrode 10 include, without limitation, $LiCoO_2$, $LiNi_{1-x-y}Co_xMn_yO_2$ (x+y≤2/3), $zLi_2MnO_3\cdot(1-z)LiNi_{01-x-y}Co_xMn_yO_2$ (x+y≤2/3), $LiMn_2O_4$, $LiNi_{0.5}Mn_{1.5}O_4$, and $LiFePO_4$. The active materials used in the negative electrode 15 may include, but not be limited to graphite and $Li_4Ti_5O_{12}$, as well as silicon and lithium metal. Alternatively, the active material for use in the negative electrode is silicon or lithium metal due to their one-magnitude higher specific capacities. The current collectors 7, 17 in both the positive 10 and negative 20 electrodes may be made of any metal known in the art for use in an electrode of a lithium battery, such as for example, aluminum for the cathode and copper for the anode. The cathode 5 and anode 15 in the positive 10 and negative 20 electrodes are generally made up of two dissimilar active materials.

The non-aqueous electrolyte 30 is used to support the oxidation/reduction process and provide a medium for ions to flow between the anode 15 and cathode 5. The non-aqueous electrolyte 30 may be a solution of a lithium salt in an organic solvent. Several examples of lithium salts, include, without limitation, lithium hexafluorophosphate ($LiPF_6$), lithium bis(oxalato)-borate (LiBOB), and lithium bis(trifluoro methane sulfonyl)imide (LiTFSi). These lithium salts may form a solution with an organic solvent, such as, for example, ethylene carbonate (EC), ethyl methyl carbonate (EMC), diethyl carbonate (DEC), dimethyl carbonate (DMC), propylene carbonate (PC), vinylene carbonate (VC), and fluoroethylene carbonate (FEC), to name a few. A specific example of an electrolyte is a 1 molar solution of $LiPF_6$ in a mixture of ethylene carbonate and diethyl carbonate (EC/DEC=50/50 vol.).

Figure 3:
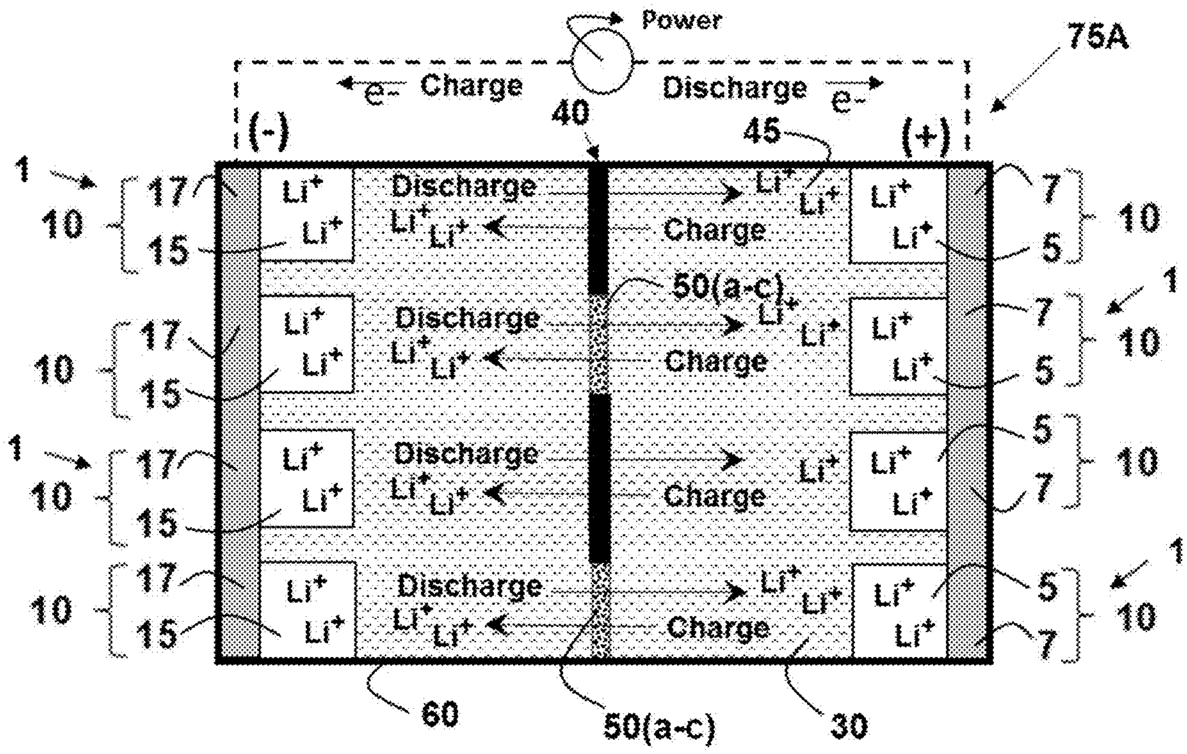
FIG. 3 is a schematic representation of a lithium-ion secondary battery formed according to the teachings of the present disclosure showing the layering of secondary cells that include one or more cells of FIG. 2B to form a larger mixed cell.
Figure 4:
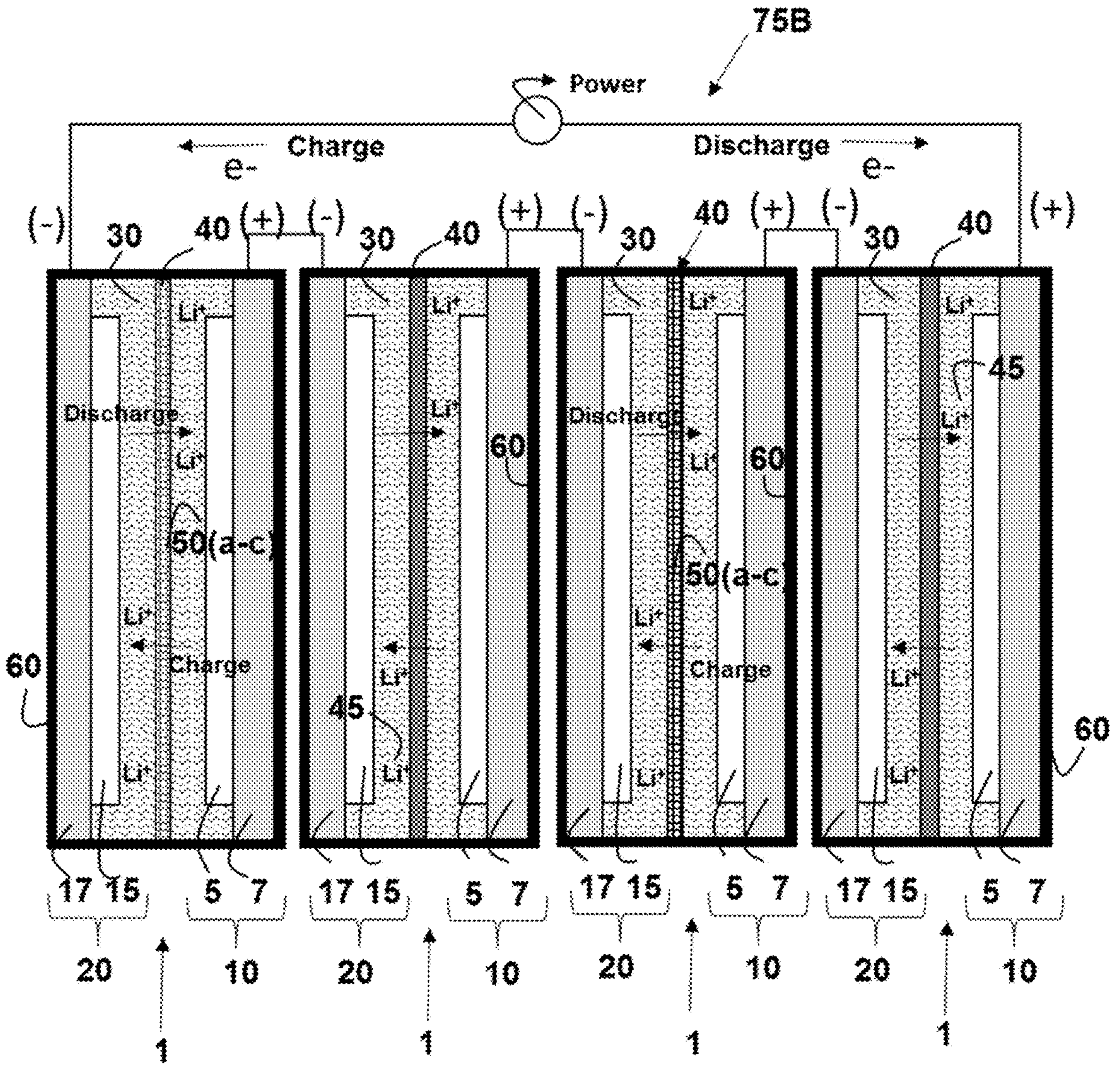
FIG. 4 is another schematic representation of a lithium-ion secondary battery formed according to the teachings of the present disclosure showing the incorporation of secondary cells that include one or more cells of FIG. 2B in series.

According to another aspect of the present disclosure, one or more secondary cells may be combined to form a lithium-ion secondary battery. In FIG. 3, an example of such a battery 75A is shown in which the four (4) secondary cells are layered to form a larger single secondary cell that is encapsulated to produce the battery 75A. In FIG. 4, another example of a battery 75B is shown, in which the four (4) secondary cells are stacked or placed in series to form a larger capacity battery 75B with each cell being individually contained. The lithium-ion secondary battery 75A, 75B also includes a housing 60 having an internal wall in which the secondary cells 1 are enclosed or encapsulated in order to provide for both physical and environmental protection. One skilled in the art will understand that although the battery 75A, 75B shown in FIGS. 3 and 4 incorporate one or more of the secondary cells of FIGS. 2A-2B having a separator 50(*a-c*) according to present disclosure. Alternatively, all of the cells may have the separator 50(*a-c*) incorporated therein. When desirable, the battery 75A, 75B may also include one or more cells in which a conventional separator is incorporated or included provided that at least one of the cells in the battery 75A, 75B incorporates a separator 50(*a-c*) formed according to the present disclosure.

The housing 60 may be constructed of any material known for such use in the art. Lithium-ion batteries generally are housed in three different main form factors or geometries, namely, cylindrical, prismatic, or soft pouch. The housing 60 for a cylindrical battery may be made of aluminum, steel, or the like. Prismatic batteries generally comprise a housing 60 that is rectangular shaped rather than cylindrical. Soft pouch housings 60 may be made in a variety of shapes and sizes. These soft housings may be comprised of an aluminum foil pouch coated with a plastic on the inside, outside, or both. The soft housing 60 may also be a polymeric-type encasing. The polymer composition used for the housing 60 may be any known polymeric materials that are conventionally used in lithium-ion secondary batteries. One specific example, among many, include the use of a laminate pouch that comprises a polyolefin layer on the inside and a polyamide layer on the outside. A soft housing 60 needs to be designed such that the housing 60 provides mechanical protection for the secondary cells 1 in the battery 75.

The specific examples provided in this disclosure are given to illustrate various embodiments of the invention and should not be construed to limit the scope of the disclosure. The embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Example 1—Li-Zeolite Powder

A FAU-type zeolite is synthesized by a hydrothermal route. The particles are in porous spheres, with $D_{10}$, $D_{50}$, and $D_{90}$ being measured to be 0.5, 1.0, and 1.5 μm, respectively. The surface area is measured to be 500 $m^2/g$, while the pore volume is 0.2 cc/g. The silica to alumina ratio (SAR) for the zeolite is between 2 and 10. The zeolite initially comprised sodium ions, which then underwent $Na^+$ exchange with $Li^+$. The concentrations of $Na_2O$ and $Li_2O$ in the zeolite are measured to be in the range of 0.1-2.0% and 3.0-9.0%, respectively. The zeolite is dried to remove any residual moisture.

Example 2—Transition-Metal Cations Trapping Capability of Li-Exchanged Zeolite The performance of the Li-exchanged zeolite as described in Example 1 with respect to adsorption capabilities for $Mn^{2+}$, $Ni^{2+}$, and $Co^{2+}$, are measured in an organic solvent, namely a mixture of ethylene carbonate and dimethyl carbonate (EC/DMC=50/50 vol.)

The trapping capabilities of the inorganic additives in the organic solvent regarding $Mn^{2+}$, $Ni^{2+}$, and $Co^{2+}$ are analyzed by inductively coupled plasma-optical emission spectrometry (ICP-OES). The organic solvent is prepared, such that it contains 1000 ppm manganese (II), nickel (II), and cobalt (II) perchlorate, respectively. The inorganic additive in particle form is added as 1 wt. % of the total mass, with the mixture being stirred for 1 minute, then allowed to stand still at 25° C. for 24 hours prior to measuring the decrease of the concentrations of $Mn^{2+}$, $Ni^{2+}$, and $Co^{2+}$. ICP shows the Li-exchanged zeolite in Example 1 decreases the concentrations of $Mn^{2+}$, $Ni^{2+}$, and $Co^{2+}$ by 75%, 65%, and 55%, respectively.

Example 3—HF Scavenging Capability of Li-Exchanged Zeolite

The HF scavenging capability of the Li-exchanged zeolite as described in Example 1 in the non-aqueous electrolyte, namely 1 M $LiPF_6$ dispersed in a mixture of ethylene carbonate and dimethyl carbonate (EC/DMC=50/50 vol.), is analyzed by a Fluoride ion specific (ISE) meter. The electrolyte solution is prepared, such that it contains 100 ppm HF. The dried Li-exchanged zeolite in particle form is added as 1 wt. % of the total mass, with the mixture being stirred for 1 minute, then allowed to stand still at 25° C. for 24 hours prior to measuring the decrease of $F^-$ in the solution. Another measure is conducted after residing for 240 hours. After treating the electrolyte solution with the Li-exchanged zeolite in Example 1, the HF concentration in the electrolyte deceases to 75 ppm after 24 hours and to 45 ppm after 240 hours.

Example 4—Separator Fabrication

The substrate is a commercial negative electrode film comprising graphite powder as the active material, carbon black as conductive agent, styrene-butadiene rubber/carboxymethylcellulose (SBR/CMC) as a polymeric binder, and a copper film as the base and current collector. The thickness of the negative electrode film is 50 μm.

A 5 wt. % PVDF solution is made with N-Methyl-2-pyrrolidone (NMP) as the organic solvent. Subsequently, the dried Li-exchanged zeolite in Example 1 is added into the solution as well as a type of boehmite particle that has been thoroughly dried. The mass ratio of the zeolite:boehmite: PVDF is 40:40:20. Then, the slurry is screen printed or coated onto the negative electrode film using 40 μm as the blade gap. After being dried in a vacuum oven at 120° C. overnight followed by pressing with a calender, the total combined thickness of the negative electrode and separator film is 70 μm. The resulting film then was finally punched into round disks having a diameter of 16 mm.

Example 5—Coin Cell Making

In order to fabricate films for use with the positive electrode, a slurry is first made by dispersing an active material (AM), such as $LiNi_{0.8}Co_{0.1}Mn_{0.1}O_2$, and carbon black (CB) powders in an n-methyl-2-pyrrolidone (NMP) solution of polyvinylidene fluoride (PVDF). The mass ratio of AM:CB:PVDF in the slurry is 90:5:5. The slurry is blade coated onto aluminum films. After drying and calendaring, the thickness of each positive electrode film formed is measured to be in the range of 50-150 μm. The positive electrode films are punched into round disks in a diameter of 14 mm respectively. The mass loading of the active material is in the range of 5-15 $mg/cm^2$.

Coin cells (2025-type) are made for evaluating the Li-exchanged zeolite separator in an electrochemical environment. The 2025-type coin cells are made along with the positive electrode disk and the combined negative electrode and separator disk as described in Example 4. A 1 M solution of $LiPF_6$ dispersed in a mixture of ethylene carbonate and dimethyl carbonate (EC/DMC=50/50 vol.) is used as the electrolyte as further described herein for battery performance testing.

Comparative Example A—Commercial Pure Polypropylene (PP) Separator

A commercial polypropylene (PP) separator (Celgard® 2400, Celgard LLC) is used in place of the Li-exchanged zeolite separator for making 2025-type coin cells for cycling under the same conditions.

Comparative Example B—Commercial Polypropylene (PP) Polyethylene (PE) Separator A commercial polypropylene (PP) separator (Celgard® 2325, Cellgard LLC) is used in place of the Li-exchanged zeolite separator for making 2025-type coin cells for cycling under the same conditions.

Comparative Example C—Commercial Alumina-Coated Separator

A commercial polypropylene (PP) separator (Celgard® Q16S1HI, Cellgard LLC) is used in place of the Li-exchanged zeolite separator for making 2025-type coin cells for cycling under the same conditions.

Example 6—Electrochemical Cycling

The coin cells made in Example 4 that contain the separator of the present disclosure prepared in Example 3 are tested and compared to coin cells formed using with commercial separators from Comparative Examples 1-3. Each of the cells are cycled between 3 and 4.3 V at the current loadings of C/3 at 25° C. after two C/10 formation cycles.

In the first formation cycle, the cells with the conventional separators (Comparative Examples A-C) and the cell with the separator formed according to the present disclosure (Example 3) show a discharge capacity and a coulombic efficiency that are approximately the same. After 100 cycles of C/5 charge-and-discharge, the cell with the separator formed according to the present disclosure (Example 3) shows a capacity loss that is less than the loss in capacity exhibited by the cells with the conventional commercial separators (Comparative Examples A-C). Similarly, the coulombic efficiency of the cell with the separator of the present disclosure (Example 3) degrades less than that observed to occur for the cells with the conventional commercial separators (Comparative Examples A-C).

Example 7—Additional Support for Performance Over Weight Ratio Range

This example provides further demonstration of the benefit associated with the use of a separator comprising a weight ratio of first inorganic particles to second inorganic particles within the range of 1:99 to 99:1. More specifically, various ratios of $1^{st}$ and $2^{nd}$ inorganic particles are used in the preparation and coating of separators according to Example 4 with cells made therefrom being prepared and evaluated according to Example 5.

Coated Separator Preparation—Pre-milled Boehmite ($2^{nd}$ inorganic particles) and Li-exchanged zeolite ($1^{st}$ inorganic particles) were prepared, such that both of the materials exhibited an average ($D_{50}$) particle size <1.0 micrometer (μm). The materials were dispersed in a mixture of water and a polymeric binder of polyvinyl alcohol (PVA) having a mass ratio of 95 wt. %/5 wt. % to form a slurry with a solid content about 26 wt. %. A total of five (5) slurries were prepared with each slurry having a different mass ratio between the Boehmite particles and the zeolite particles incorporated therein as described in Table 1. Each slurry was thoroughly mixed using a planetary mixer (Thinky Corporation, Japan) and then used to apply a 3-4 μm thick coating via a doctor-blade technique to a 25 μm thick polypropylene (PP) separator. The coated separators were then dried in air and cut into disks for use in the preparation and evaluation of full cells.

TABLE 1

Slurry composition for the separator coating

| | $1^{st}$:$2^{nd}$ Particle Ratio | $1^{st}$ Particle (Zeolite, g) | $2^{nd}$ Particle (Boehmite, g) | Polyvinyl Alcohol (PVA, g) | Water (g) |
|---|---|---|---|---|---|
| Ex-7a | 25:75 | 0.24 | 0.71 | 0.05 | 2.8 |
| Ex-7b | 50:50 | 0.475 | 0.475 | 0.05 | 2.8 |
| Ex-7c | 75:25 | 0.71 | 0.24 | 0.05 | 2.8 |
| C-7d | 0:100 | 0 | 0.95 | 0.05 | 2.8 |
| C-7e | 0:0 | 0 | 0 | 0 | 0 |
| C-7f | 100:0 | 0.95 | 0 | 0.05 | 2.8 |

Cell Preparation and Evaluation—Full cells having a cathode layer, a separator selected from Table 1, and an anode layer were fabricated as stacked single-layer pouch cells. The cathode was prepared from $Li(Ni_{0.6}Co_{0.2}Mn_{0.2})O_2$ (NCM622), carbon nanotubes (CNTs) and polyvinylidene fluoride (PVDF) in a ratio of NCM622/CNT/PVDF=97/1.5/1.5 and with an areal mass loading about 27 $mg/cm^2$. The anode was made from artificial graphite, ceramic matrix composite (cmc), and styrene-butadiene rubber (SBR) in a ratio of graphite/cmc/SBR=96/2/2 and with an areal mass loading about 20 $mg/cm^2$. Both the anode and cathode were calendared before the cell preparation. The electrolyte was 1 Molar $LiPF_6$ in a mixture of ethylene carbonate and diethyl carbonate (EC/DEC=25/75 vol.), 1% vinylene carbonate (VC), and 1% fluoroethylene carbonate (FEC). The cell was clamped with two paper clips for cell evaluation.

A floating test at 60° C. was used to evaluate the performance of each full cell. The test was conducted by placing each cell inside a pre-heated oven and then undergoing charge/discharge cycling at ~C/10 rate for two cycles between 2.7 V and 4.2 V. Then, the cell was charged to 4.2 V and held at 4.2 V for 3 days before discharging to 2.7 V. The cell was then charged/discharged for one additional cycle. When desirable, the cells may be continued to be charged back to 4.2 V, held at 4.2 V for 3 days, and then discharged to 2.7 V for another round of floating tests.

The slurries containing only pure Boehmite (C-7d) or pure zeolite (C-7f) appeared to be more gel-like than the slurries containing the mixed $1^{st}/2^{nd}$ particles (Ex-7a, Ex-7b, Ex-7c). Thus, the slurries containing the mixture of $1^{st}/2^{nd}$ inorganic particles are more attractive for the practical application of a coating because these slurries exhibit more fluid-like properties, thereby, making them easier to apply as a coating in a continuous industrial coating process.

Figure 5:
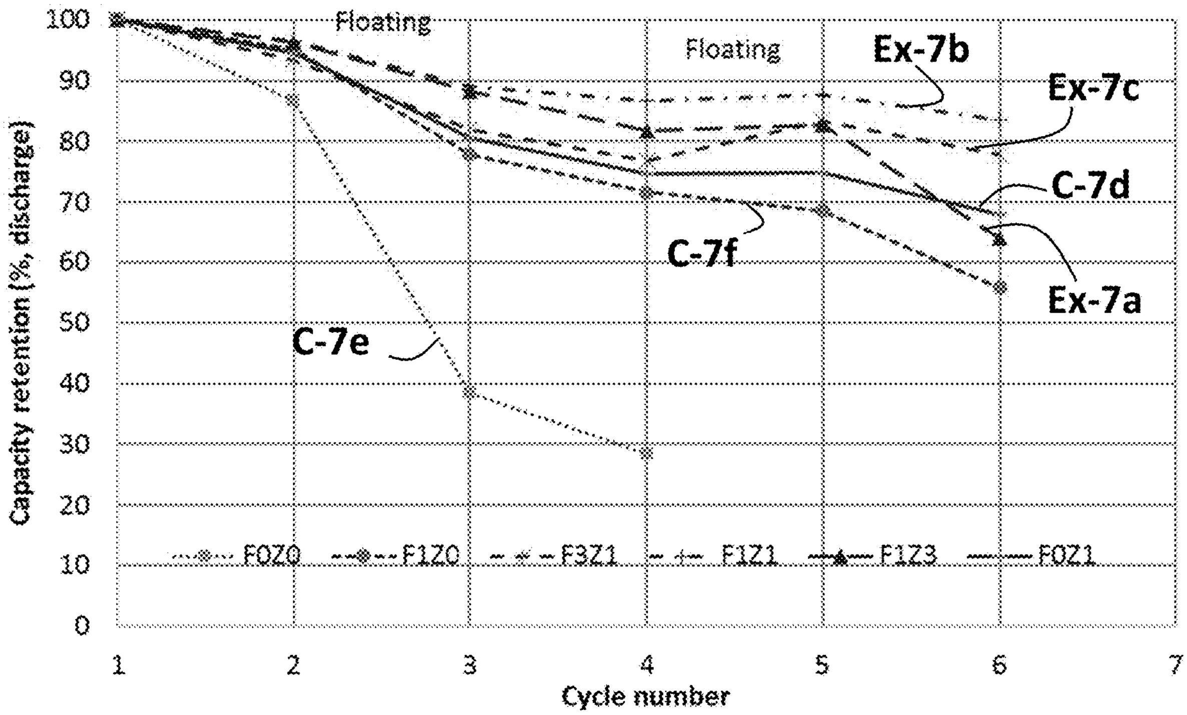
FIG. 5 is a graphical comparison of the capacity retention exhibited during a 60° C. floating test by full cells with and without the separator formed according to the method of FIG. 1.

The stability exhibited by each of the full cells during the floating test is shown in FIG. 5. The capacity retention from the cells containing the coated separators (Ex-7a, Ex-7b, Ex-7c, C-7d, C-7f) was higher than the capacity retention exhibited by the cell containing a non-coated PP separator (C-7e). Among the cells containing the coated separators, the discharge capacity after the $1^{st}$ floating test (i.e., $3^{rd}$ cycle) showed that Ex-7a=Ex-7b>Ex-7c>C-7d>C-7f. Immediately after the $2^{nd}$ floating test (i.e., $5^{th}$ cycle), the capacity retention was in the order of Ex-7b>Ex-7a=Ex-7c>C-7d>C-7f. In all cases, the cells containing the mixed coating materials (Ex-7a, Ex-7b, Ex-7c) exhibited a higher capacity retention than the cells containing only one of the materials (C-7d, C-7f). However, since the capacity fading for cell Ex-7a seemed to be faster than that for cells Ex-7b or Ex-7c, a cell with a mixing ratio with more of the $2^{nd}$ inorganic particle (e.g., Boehmite) may be preferred for better stability. This example further substantiates that a composite separator of the present disclosure should comprise a plurality of $1^{st}$ inorganic particles, and one or more $2^{nd}$ inorganic particles in a polymeric binder, such that the mass ratio of the $1^{st}$ to $2^{nd}$ inorganic particles is in the range 1:99 to 99:1; alternatively, in the range from 25:75 to 75:25; alternatively, 50:50 to 25:75.

For the purpose of this disclosure, the terms "about" and "substantially" are used herein with respect to measurable values and ranges due to expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one metal", "one or more metals", and "metal(s)" may be used interchangeably and are intended to have the same meaning.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A composite separator for use in an electrochemical cell, the composite separator comprising:

a plurality of first inorganic particles, the first inorganic particles being a type of Li-exchanged zeolite having a lithium (Li) concentration in the range of 0.1 wt. % to 20 wt. % and a sodium (Na) concentration that is lower than 5 wt. %, based on the overall weight of the Li-exchanged zeolite;

one or more second inorganic particles, wherein the second inorganic particles are different in composition than the first inorganic particles; the second inorganic particles having a sodium (Na) concentration in the range of 0.005 wt. % to 1.0 wt. %; and a polymeric binder;

wherein the weight ratio of the first inorganic particles to the second inorganic particles is in the range from 1:99 to 99:1 and the weight ratio of the combined first and second inorganic particles to the polymeric binder is in the range from 50:50 to 99:1; and wherein the plurality of first inorganic particles, the one or more second inorganic particles, and the polymeric binder form a porous layer or film attached to a surface of either a positive electrode film or a negative electrode film, the porous layer or film being configured to perform as the composite separator.

2. The composite separator according to claim 1, wherein the polymeric binder is a polyacrylic acid (PAA), a polyamide-imide (PAI), a polyacrylonitrile (PAN), a polyaniline (PANI), a polyether ether ketone (PEEK), a polyethylene glycol (PEG), a polyethylene oxide (PEO), a polyethylene terephthalate (PETG), a polymethyl methacrylate (PMMA), a polyphthalamide (PPA), a polystyrene (PS), a polyurethane (PU), a polyvinyl alcohol (PVA), a polyvinyl chloride (PVC), a polyvinylidene fluoride (PVDF), a polyvinylpyrrolidone (PVP), or a combination thereof.

3. The composite separator according to claim 1, wherein the electrochemical cell comprises a positive electrode, a negative electrode, a non-aqueous electrolyte, and the composite separator.

4. The composite separator according to claim 3, wherein the Li-exchanged zeolites are configured to scavenge moisture ($H_2O$), hydrofluoric acid (HF), and/or free transition-metal ions present in the non-aqueous electrolyte.

5. The composite separator according to claim 1, wherein the Li-exchanged zeolite has a framework selected from ABW, AFG, BEA, BHP, CAS, CHA, CHI, DAC, DOH, EDI, ESV, FAU, FER, FRA, GIS, GOO, GON, HEU, KFI, LAU, LTA, LTN, MEI, MER, MOR, MSO, NAT, NES, PAR, PAU, PHI, RHO, RTE, SOD, STI, TER, THO, VET, YUG, and ZSM.

6. The composite separator according to claim 1, wherein the Li-exchanged zeolite has a $SiO_2/Al_2O_3$ ratio that is between 1 and 100 and an average particle size ($D_{50}$) that is in the range from 0.01 μm to 2 μm.

7. The composite separator according to claim 1, wherein the Li-exchanged zeolite has a surface area in the range of 10-1000 $m^2/g$ and a pore volume in the range of 0.1-2.0 cc/g.

8. The composite separator according to claim 1, wherein the second inorganic particles are selected from the group consisting of silica, α-alumina, β-alumina, γ-alumina, θ-alumina, κ-alumina, X-alumina, magnesium oxide, titanium oxide, zirconium oxide, alumina silicate, calcium silicate, magnesium silicate, calcium carbonate, boehmite, pseudo-boehmite, kaolin, aluminum hydroxide, magnesium hydroxide, and perovskites.

9. The composite separator according to claim 8, wherein the one or more second inorganic particles are selected as α-alumina, β-alumina, γ-alumina, θ-alumina, boehmite, pseudo-boehmite, and aluminum hydroxide.

10. The composite separator according to claim 1, wherein the second inorganic particles exhibit a morphology that is either platelet, cubic, sphere, irregular, or a mixture thereof.

11. The composite separator according to claim 1, wherein the second inorganic particles have an average particle size ($D_{50}$) in the range of 0.01 micrometers (μm) to about 2 μm.

12. The composite separator according to claim 1, wherein the concentration of sodium (Na) in the second inorganic particles is in the range of 0.007 wt. % and 0.75 wt. % based on the overall weight of the second inorganic particles.

13. The composite separator according to claim 1, wherein the thickness of the composite separator ranges from 5 μm to 50 μm and the porosity of the composite separator is between 20% and 60%.

14. A method of forming a composite separator for use in an electrochemical cell, the method comprising:

drying a plurality of first inorganic particles, the first inorganic particles being a type of Li-exchanged zeolite having a lithium (Li) concentration in the range of 0.1 wt. % to 20 wt. % and a sodium (Na) concentration that is lower than 5 wt. %, based on the overall weight of the Li-exchanged zeolite;

drying one or more second inorganic particles, wherein the second inorganic particles are different in composition than the first inorganic particles; the second inorganic particles having a sodium (Na) concentration in the range of 0.005 wt. % to 1.0 wt. %;

combining the dried first and second inorganic particles with a polymeric binder in an organic solvent to form a slurry; wherein the weight ratio of the first inorganic particles to the second inorganic particles is in the range from 1:99 to 99:1; the weight ratio of the combined first and second inorganic particles to the polymeric binder is in the range from 50:50 to 99:1; and the solid loading in the slurry is between 1% to 50%;

depositing the slurry onto a surface of either a positive electrode film or a negative electrode film to form a layer thereon; and drying the deposited slurry layer to form the composite separator according to claim 1, wherein the composite separator is adhered to the surface of either the positive electrode film or the negative electrode film.

15. The method according to claim 14, wherein the organic solvent is 1-butanol, acetone, diethylene glycol, diethyl ether, dimethylformamide (DMF), ethanol, ethyl acetate, ethylene glycol, isopropanol, methanol, pentane, toluene, or a mixture thereof.

16. The method according to claim 14, wherein the depositing of the slurry uses an extrusion process or a coating process.

17. The method according to claim 16, wherein the coating process comprises screen printing, film casting, gravure coating, knife-coating, spray coating, or dip coating.

18. The method according to claim 14, wherein the slurry is dried under vacuum with or without the application of heat.

19. The method according to claim 14, wherein the composite separator and the positive electrode film or negative electrode film are adhered to one another such that no substantial delamination is observed.

20. A cell for use in an electrochemical cell, such as a lithium-ion secondary battery, the cell comprising:

a positive electrode, the positive electrode comprising an active material as a cathode for the cell and a current collector that is in contact with the cathode; wherein lithium ions flow from the cathode to the anode when the cell is charging;

a negative electrode, the negative electrode comprising an active material as an anode for the cell and a current collector that is in contact with the anode; wherein lithium ions flow from the anode to the cathode when the cell is discharging;

a non-aqueous electrolyte positioned between and in contact with both the negative electrode and the positive electrode; wherein the non-aqueous electrolyte supports the reversible flow of lithium ions between the positive electrode and the negative electrode; and a composite separator according to claim 1 permeable to the reversible flow of lithium ions; the composite separator being placed between the positive electrode and negative electrode, such that the separator adheres to the surface of either the positive electrode or the negative electrode.

* * * * *